(12) United States Patent
Lee et al.

(10) Patent No.: US 11,932,071 B2
(45) Date of Patent: Mar. 19, 2024

(54) APPARATUS AND METHOD FOR CONTROLLING VEHICLE SUSPENSION

(71) Applicants: Hyundai Motor Company, Seoul (KR); Kia Motors Corporation, Seoul (KR)

(72) Inventors: Jin Hee Lee, Pyeongtaek-Si (KR); Baek Hee Lee, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 581 days.

(21) Appl. No.: 17/165,662

(22) Filed: Feb. 2, 2021

(65) Prior Publication Data

US 2022/0032709 A1 Feb. 3, 2022

(30) Foreign Application Priority Data

Jul. 30, 2020 (KR) .................. 10-2020-0095339

(51) Int. Cl.
*B60G 17/0165* (2006.01)
*B60G 17/018* (2006.01)
*B60G 17/019* (2006.01)

(52) U.S. Cl.
CPC ..... *B60G 17/0165* (2013.01); *B60G 17/0182* (2013.01); *B60G 17/01908* (2013.01); *B60G 2400/0522* (2013.01); *B60G 2400/102* (2013.01); *B60G 2400/252* (2013.01); *B60G 2400/821* (2013.01); *B60G 2600/1871* (2013.01); *B60G 2600/60* (2013.01)

(58) Field of Classification Search
CPC ........... B60G 17/0165; B60G 17/0182; B60G 17/01908; B60G 2400/0522; B60G 2400/102; B60G 2400/252; B60G 2400/821; B60G 2600/1871; B60G 2600/60; B60G 2500/10; B60G 2400/82; B60G 17/06; B60W 10/22; B60W 40/06; B60W 2050/0052; G06N 20/00
See application file for complete search history.

(56) References Cited

U.S. PATENT DOCUMENTS

| 5,467,280 A * | 11/1995 | Kimura | ................. B60G 17/08 280/5.515 |
|---|---|---|---|
| 8,676,508 B2 | 3/2014 | Schwarz | |
| 9,669,839 B2 | 6/2017 | Wagner | |

(Continued)

FOREIGN PATENT DOCUMENTS

| DE | 41 33 238 A1 | 4/1993 |
|---|---|---|
| DE | 10 2008 052 999 A1 | 4/2009 |

(Continued)

*Primary Examiner* — Rodney A Butler
(74) *Attorney, Agent, or Firm* — MORGAN, LEWIS & BOCKIUS LLP

(57) ABSTRACT

An apparatus and a method for controlling a vehicle suspension, may include a variable damper provided between a vehicle body and a wheel, a sensor that measures a vehicle body vertical acceleration and a wheel vertical acceleration, and a controller that estimates a road surface roughness based on the vehicle body vertical acceleration and the wheel vertical acceleration, predicts a road surface grade based on the estimated road surface roughness, and adjusts damping force of the variable damper corresponding to the predicted road surface grade.

20 Claims, 8 Drawing Sheets

(56) References Cited

U.S. PATENT DOCUMENTS

| | | |
|---|---|---|
| 10,407,076 B2 | 9/2019 | Luo et al. |
| 2004/0094912 A1* | 5/2004 | Niwa ................. B60G 17/0165 |
| | | 280/5.518 |
| 2011/0245995 A1 | 10/2011 | Schwarz |
| 2016/0201277 A1* | 7/2016 | Svantesson ............. E01C 23/01 |
| | | 73/146 |
| 2016/0244065 A1 | 8/2016 | Wagner |
| 2018/0304900 A1 | 10/2018 | Luo et al. |
| 2020/0270824 A1* | 8/2020 | Nagayama ............. G01B 21/30 |

FOREIGN PATENT DOCUMENTS

| | | |
|---|---|---|
| DE | 10 2009 009 888 A1 | 10/2009 |
| DE | 10 2008 055 905 A1 | 5/2010 |
| DE | 10 2009 033 219 A1 | 7/2010 |
| DE | 10 2015 203 062 A1 | 8/2016 |
| KR | 10-2018-0116216 A | 10/2018 |
| KR | 10-2019-0093815 A | 8/2019 |

* cited by examiner

APPARATUS AND METHOD FOR CONTROLLING VEHICLE SUSPENSION

CROSS-REFERENCE TO RELATED APPLICATION

The present application claims priority to Korean Patent Application No. 10-2020-0095339, filed on Jul. 30, 2020 the entire contents of which is incorporated herein for all purposes by this reference.

BACKGROUND OF THE INVENTION

Field of the Invention

The present invention relates to an apparatus and a method for controlling suspension of a vehicle.

Background

A vehicle is provided with a suspension that absorbs an impact between a vehicle body and a wheel (axle) and maintains the road surface-contact of a tire. Suspension (system) includes an arm or link that controls the movement of a wheel, a spring that absorbs and regulates a shock, and a damper, also called a shock absorber. Because the spring and damper operate only within a physically defined specific range and move passively between the vehicle body and the wheels, the spring and damper affect the ride comfort, handling and/or steering response of the vehicle. Accordingly, techniques for adjusting the characteristics of suspension (e.g., spring characteristics, damper characteristics, and the like) have been studied to provide an optimal ride comfort, handling and/or steering response to a vehicle driver.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus and method for controlling a vehicle suspension that utilizes a road surface roughness estimated in real time through measurement values of vertical acceleration sensors attached to a vehicle body and a wheel and a prediction model learned in advance based on machine learning to classify the roughness grade of a road surface, and controls the damping force of a variable damper based on the classified roughness grade of the road surface.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an apparatus of controlling a vehicle suspension includes a variable damper provided between a vehicle body and a wheel, a sensor that measures a vehicle body vertical acceleration and a wheel vertical acceleration, and a controller that estimates a road surface roughness based on the vehicle body vertical acceleration and the wheel vertical acceleration, predicts a road surface grade based on the estimated road surface roughness, and adjusts damping force of the variable damper corresponding to the predicted road surface grade.

The sensor may include a first acceleration sensor mounted on each corner of the vehicle body to measure a vertical acceleration of each corner of the vehicle body, and a second acceleration sensor mounted on each wheel of the vehicle to measure a vertical acceleration of each wheel.

The controller may obtain vertical speeds of the vehicle body and the wheel through integration after filtering noise from the vehicle body vertical acceleration and the wheel vertical acceleration measured by the sensor.

The controller may estimate and cumulatively store the road surface roughness by use of a Kalman filter for a first storage time period.

The controller may convert the estimated road surface roughness into frequency domain data through frequency analysis, extract feature information from the estimated road surface roughness and the frequency domain data, classify the road surface grade by use of the feature information and a machine learning-based prediction model, cumulatively store the road surface grades classified for a second storage time period, and determine a final road surface grade based on the cumulative road surface grades.

The controller may be configured to determine a skyhook control gain and a passive damping control gain based on the road surface grade, determine skyhook required damping force based on gravity center motion information related to the vehicle body and the skyhook control gain, determine passive damping force by use of a vehicle body vertical speed, a wheel vertical speed and the passive damping control gain, and determine final damping force required for each corner based on the skyhook required damping force and the passive damping force.

The controller may be configured to determine a vertical speed, a pitch angular speed, and a roll angular speed of a vehicle gravity center by use of the vehicle body vertical speed and vehicle specification information, determine the skyhook required damping force proportional to the vertical speed, the pitch angular speed, and the roll angular speed of the vehicle gravity center and the skyhook control gain, and allocate damping force required for each corner to attenuate the vertical speed, the pitch angular speed, and the roll angular speed of the vehicle gravity center based on the skyhook required damping force.

The controller may be configured to generate a current signal based on the final damping force required for each corner and apply the current signal to the variable damper.

The controller may be configured to determine an amount of current applied to the variable damper based on the final damping force required for each corner and characteristics of the variable damper.

The controller may limit maximum and minimum currents applied to the variable damper in consideration of an actuator load and the minimum current of the variable damper.

According to various aspects of the present invention, a method of controlling a vehicle suspension includes measuring a vehicle body vertical acceleration and a wheel vertical acceleration, estimating a road surface roughness based on the vehicle body vertical acceleration and the wheel vertical acceleration, predicting a road surface grade based on the road surface roughness, and adjusting damping force of a variable damper corresponding to the road surface grade.

The method may further include filtering noise from the vehicle body vertical acceleration and the wheel vertical acceleration, and obtaining a vehicle body vertical speed and a wheel vertical speed by integrating the vehicle body vertical acceleration and the wheel vertical acceleration filtered.

The estimating of the road surface roughness may further include estimating the road surface roughness by use of a Kalman filter.

The estimating of the road surface roughness may further include cumulatively storing the road surface roughness for a first storage time period.

The predicting of the road surface grade may include converting the estimated road surface roughness into frequency domain data through frequency analysis, extracting feature information from the estimated road surface roughness and the frequency domain data, classifying the road surface grade by use of the feature information and a machine learning-based prediction model, cumulatively storing the road surface grades classified for a second storage time period, and determining a final road surface grade based on the cumulative road surface grades.

The adjusting of the damping force of the variable damper may include determining a skyhook control gain and a passive damping control gain based on the road surface grade, determining skyhook required damping force based on gravity center motion information related to the vehicle body and the skyhook control gain, determining passive damping force by use of a vehicle body vertical speed, a wheel vertical speed and the passive damping control gain, and determining final damping force required for each corner based on the skyhook required damping force and the passive damping force.

The determining of the skyhook required damping force may include determining a vertical speed, a pitch angular speed and a roll angular speed of a vehicle gravity center by use of the vehicle body vertical speed and vehicle specification information, determining the skyhook required damping force proportional to the vertical speed, the pitch angular speed and the roll angular speed of the vehicle gravity center and the skyhook control gain, and allocating damping force required for each corner to attenuate the vertical speed, the pitch angular speed and the roll angular speed of the vehicle gravity center based on the skyhook required damping force.

The method may further include generating a current signal based on the final damping force required for each corner and applying the current signal to the variable damper.

The generating and applying of the current signal to the variable damper may include determining an amount of current based on the final damping force required for each corner and characteristics of the variable damper.

The generating and applying of the current signal to the variable damper may include limiting maximum and minimum currents applied to the variable damper in consideration of an actuator load and the minimum current of the variable damper.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
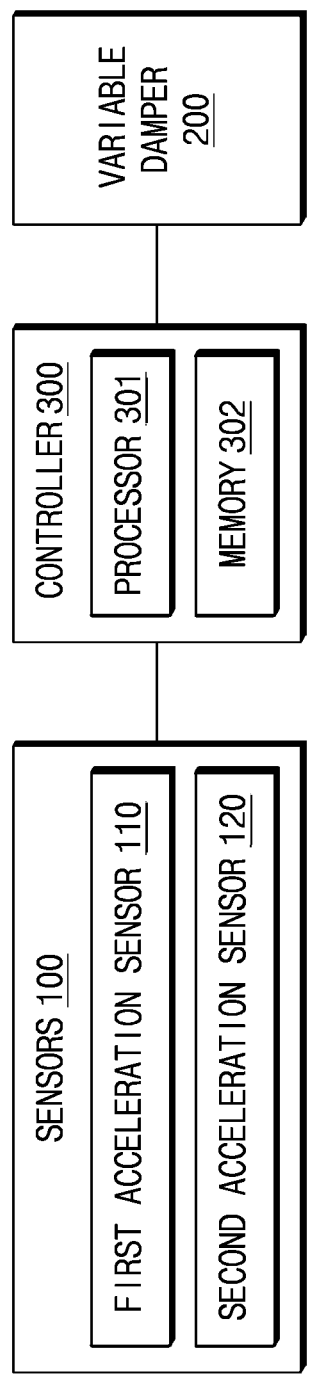
FIG. 1 is a block diagram illustrating an apparatus of controlling a vehicle suspension according to exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used In the instant casein, including technical or scientific terms, have the same meanings as those understood by those skilled in the art to which various exemplary embodiments of the present invention pertains. Such terms as those defined in a used dictionary are to be interpreted as having meanings equal to the contextual meanings in the relevant field of art, and are not to be interpreted as having ideal or excessively formal meanings unless clearly defined as having such in the present application.

Various aspects of the present invention are directed to providing a technology that controls damping force by changing a control gain corresponding to a road surface roughness while an existing control logic such as sky-hook control is maintained in a four-wheel vehicle provided with a continuous damping control (CDC) damper.

Figure 2:
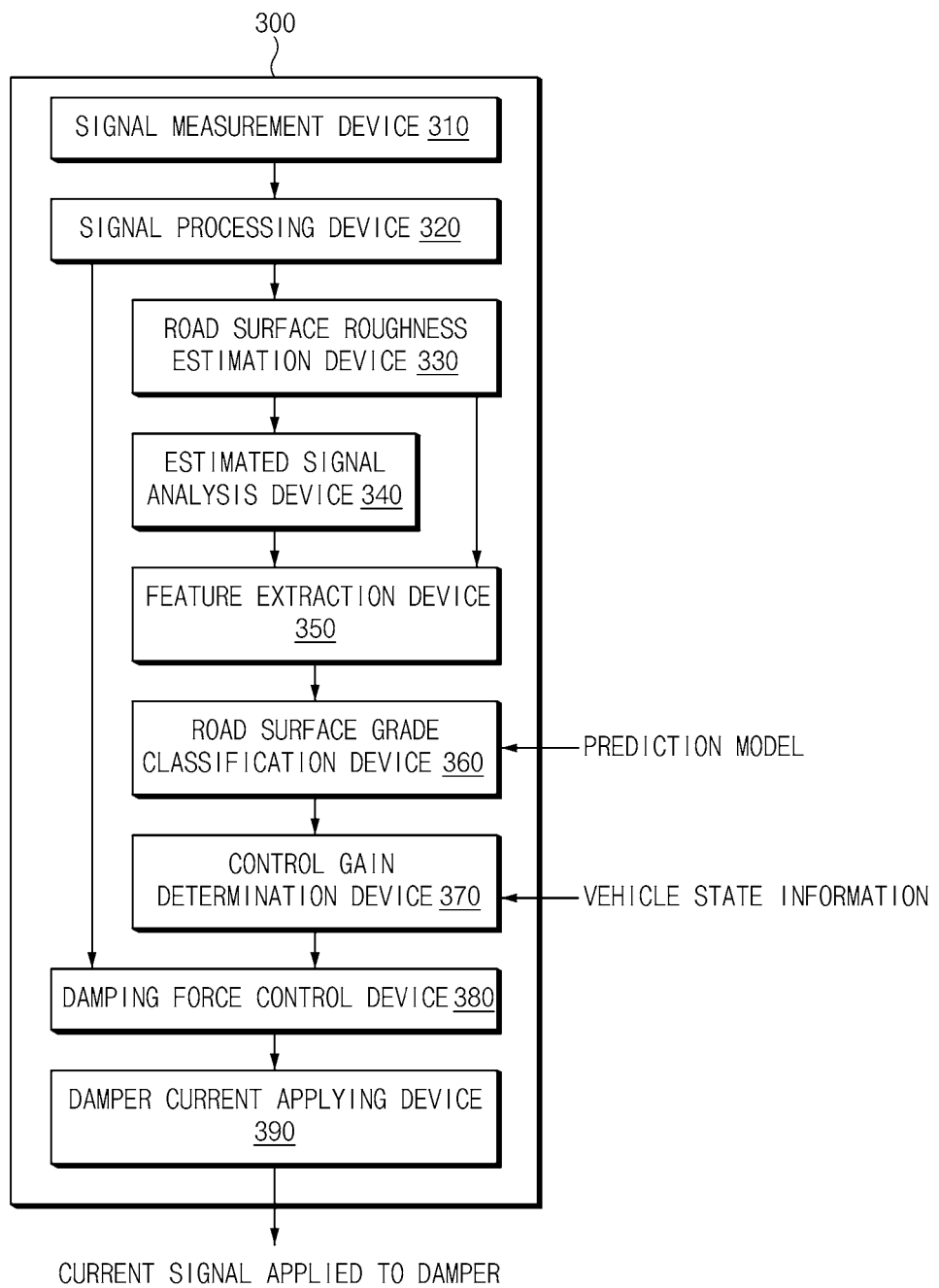
FIG. 2 is a block diagram illustrating a functional configuration of a controller illustrated in FIG. 1.
Figure 3:
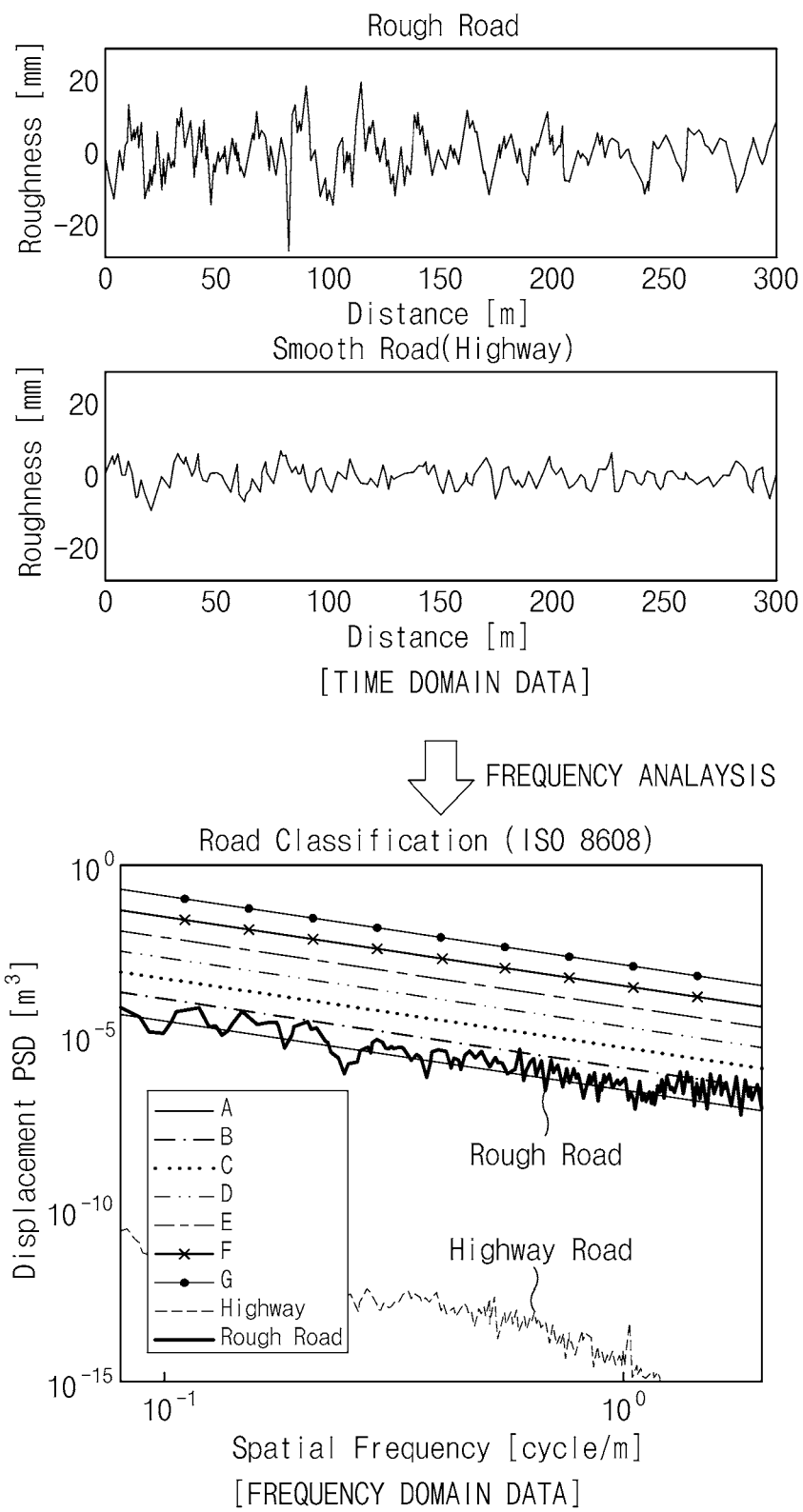
FIG. 3 is an exemplary diagram illustrating data conversion through spatial frequency analysis according to exemplary embodiments of the present invention.

FIG. 1 is a block diagram illustrating an apparatus of controlling a vehicle suspension according to exemplary embodiments of the present invention. FIG. 2 is a block diagram illustrating a functional configuration of a controller illustrated in FIG. 1. FIG. 3 is an exemplary diagram illustrating data conversion through spatial frequency analysis according to exemplary embodiments of the present invention.

Referring to FIG. 1, an apparatus of controlling a vehicle suspension includes sensors 100, a variable damper 200, and a controller 300.

The sensors 100 is mounted on a vehicle body and a wheel to measure a vehicle body vertical acceleration and a wheel vertical acceleration. The sensors 100 may include at least three or more first acceleration sensors 110 and at least two or more second acceleration sensors 120. The first acceleration sensors 110 may be attached to the top mount portions of four corners of a vehicle body to measure the vertical accelerations of the corners, respectively. For example, the first acceleration sensors 110 may be mounted at left and right front corners and left and right rear corners of the vehicle body, or may be provided on the left and right front corners and one point of the rear portion, respectively. The second acceleration sensors 120 may be attached to knuckles of wheels to measure the wheel vertical accelerations, respectively.

The variable damper 200 may be mounted between the vehicle body and the wheel (axle) to mitigate shock or vibration transmitted from a road surface to a tire while the vehicle is driven. The variable dampers 200 may be provided between the vehicle body and the left and right front wheels and the left and right rear wheels, respectively. The variable damper 200 may include a solenoid valve for adjusting damping force. The variable damper 200 may adjust the actual damping force through operation of the solenoid valve. In the instant case, the variable damper 200 using a solenoid valve as an actuator is referred to as an example thereof, but a stepping motor or the like may be used as an actuator. As the variable damper 200, not only a CDC damper but also various variable dampers may be applied.

The controller 300 is an electronic control unit (ECU) that controls the damping force of the variable damper 200 in the suspension. The controller 300 may obtain a vehicle body vertical acceleration and a wheel vertical acceleration by use of the sensors 100. In the instant case, the vehicle body vertical acceleration may include, as a vertical acceleration of each corner of the vehicle body, a vertical acceleration in the left front corner of the vehicle body, a vertical acceleration in the right front corner of the vehicle body, a vertical acceleration in a left rear corner of the vehicle body, and a vertical acceleration in a right rear corner of the vehicle body. The vertical acceleration of the wheel may include a vertical acceleration of the front left wheel, a vertical acceleration of the front right wheel, a vertical acceleration of the left rear wheel, and a vertical acceleration of the right rear wheel.

The controller 300 may estimate the roughness (disturbance speed) of the road surface in real time based on the vehicle body vertical acceleration and the wheel vertical acceleration. The controller 300 may extract feature information from the estimated road roughness, and classify the grade of the road surface roughness in real time using the extracted feature information and the learned prediction model. In the instant case, the prediction model may be generated through machine learning utilizing a road surface profile database. The controller 300 may control the damping force of the variable damper 200 by adjusting the control gain of the variable damper 200 based on the grade of the classified road roughness, that is, the road surface grade.

The controller 300 may include a processor 301 and a memory 302. The processor 301 controls the overall operation of the controller 300. The processor 301 may be implemented with at least one of an application specific integrated circuit (ASIC), a digital signal processor (DSP), a programmable logic device (PLD), field programmable gate arrays (FPGAs), a central processing unit (CPU), a microcontroller, and/or a microprocessor. The memory 302 may be a non-transitory storage medium that stores instructions executed by the processor 301. The memory 302 may be implemented with at least one of a storage medium (recording medium) such as a flash memory, a hard disk, a secure digital (SD) card, a random access memory (RAM), a static random access memory (SRAM), a read only memory (ROM), a programmable read only memory (PROM), an electrically erasable and programmable ROM (EEPROM), an erasable and programmable ROM (EPROM), a register, and/or the like.

Hereinafter, a functional configuration of the controller 300 will be described with reference to FIG. 2.

The controller 300 may include a signal measurement device 310, a signal processing device 320, a road surface roughness estimation device 330, an estimated signal analysis device 340, a feature extraction device 350, a road surface grade classification device 360, a control gain determination device 370, a damping force control device 380, and a damper current applying device 390. In the instant case, each configuration may mean logic that performs a specific function, and each logic may be executed by the processor 301.

The signal measurement device 310 may obtain (receive) signals measured by the first and second acceleration sensors 110 and 120. The signal measurement device 310 may measure a vehicle body vertical acceleration of each corner by use of the first acceleration sensor 110. The signal measurement device 310 may measure the wheel vertical acceleration of each wheel by use of the second acceleration sensor 120.

The signal processing device 320 may perform filtering to remove noise included in a vehicle body vertical acceleration signal of each corner and a wheel vertical acceleration signal of each wheel measured by the first and second acceleration sensors 110 and 120. In other words, the signal processing device 320 may filter noise from measurement signals (sensing signals) received from the first and second acceleration sensors 110 and 120. In addition, the signal processing device 320 may determine the vehicle body vertical speed of each corner and the wheel vertical speed of each wheel by integrating the vehicle body vertical acceleration of each corner and the wheel vertical acceleration of each wheel. The signal processing device 320 may determine vehicle body displacement information related to each corner and wheel displacement information related to each wheel by integrating the vehicle body vertical speed of each corner and the wheel vertical speed of each wheel.

The road surface roughness estimation device 330 may estimate the roughness of a road surface in real time based on the vehicle body vertical acceleration of each corner and the wheel vertical acceleration of each wheel measured by the signal measurement device 310 and the vehicle body vertical speed of each corner and the wheel vertical speed of each wheel processed by the signal processing device 320, and the like. The road surface roughness estimation device 330 may estimate the road surface roughness by use of a Kalman filter and/or a vehicle model.

The estimated signal analysis device 340 may analyze an estimated road surface roughness (road surface disturbance speed) signal output from the road surface roughness estimation device 330 in real time by frequency analysis (e.g., spatial frequency analysis) to output the frequency analysis result. The estimated signal analysis device 340 may cumulatively store the road surface roughness information estimated by the road surface roughness estimation device 330 for a first storage time period (t1) preset by the developer, and perform the frequency analysis (spatial frequency analysis) for the cumulatively stored estimated road surface roughness information. For example, as shown in FIG. 3, the estimated signal analysis device 340 may convert the road surface roughness, which is time domain data, into frequency domain data (spatial frequency domain data) through frequency analysis (spatial frequency analysis).

The feature extraction device 350 may extract feature information from the estimated road surface roughness information using the estimated road surface roughness information (time domain data) and a frequency analysis result (spatial frequency domain data). The feature information may include a root mean square (RMS) (e.g., RMS of road roughness) of each state quantity in the time domain and/or a slope and intercept of a linear feedback model of road roughness in the frequency domain. The feature information may be further defined by the developer.

The road surface grade classification device 360 may determine the roughness grade (road surface grade) of a road surface in real time by use of a road surface grade prediction (classification) model generated through machine learning and the extracted feature information. The road surface grade classification device 360 may be activated every first storage time period t1 to classify the road surface grade (e.g., class A, B, C, D, and E), and store the classified road surface grade for the second storage time period t2. In the instant case, the first storage time period t1 is smaller than the second storage time period t2.

The control gain determination device 370 may determine a control gain of the variable damper 200 based on the road surface grade classified in real time and vehicle status information. In other words, the control gain determination device 370 may determine the skyhook control gain and the passive damping control gain by use of the road surface grade predicted through the prediction model and the vehicle status information. The vehicle status information may include a speed (vehicle speed), a vertical acceleration, a lateral acceleration, a steering angle, and the like of the vehicle. The vehicle status information may be obtained through a wheel speed sensor, a vertical acceleration sensor, a lateral acceleration sensor, a steering angle sensor, and the like of the sensors 100. In the instant case, the skyhook control logic and the passive damping control logic for controlling the damping force of the variable damper 200 have been described as an example, but the exemplary embodiments are not limited thereto, and other control logic may be added. When other control logic is added, the control gain determination device 370 may determine a control gain for the added control logic.

The damping force control device 380 may determine the vertical speed, the pitch angular speed, and the roll angular speed of the vehicle body gravity center (the vehicle gravity center) based on the vehicle body vertical speed for each corner and the vehicle specification information. The vehicle control information may be stored in the memory 302 and may include a wheelbase, a wheel tread, a distance between a front wheel and a vehicle body gravity center, and/or a distance between a rear wheel and a vehicle body gravity center. The damping force control device 380 may determine a vertical speed, a pitch angular speed, and a roll angular speed of the vehicle body gravity center by use of a vehicle kinematic relation formula. In the instant case, the vehicle kinematic relation formula may vary depending on the number of acceleration sensors mounted on the vehicle body and wheels.

The damping force control device 380 may determine the skyhook required damping force in each direction based on three-direction speeds (e.g., the vertical speed, the pitch angular speed, and the roll angular speed) of the vehicle body gravity center and the skyhook control gain. In detail, the damping force control device 380 may determine force and moment required for skyhook control based on the three-direction speed of the vehicle body gravity center (vehicle body gravity center motion information) and the skyhook control gain determined by the control gain determination device 370. The damping force control device 380 may allocate the required damping force for each corner of the vehicle body based on the determined required force and moment. The damping force control device 380 may determine a virtual tire damping required damping force based on the vehicle body vertical speed of each corner, the wheel vertical speed for each wheel, and the passive damping control gain. In other words, the damping force control device 380 may determine the required damping force of the passive damper based on the relative speed between the vehicle body and the wheel.

The damping force control device 380 may determine the final required damping force for each corner (that is, the damper control force) by use of the determined damping force required for each corner of the vehicle body (skyhook required damping force for each wheel) and the required damping force for each wheel. The damping force control device 380 may determine a damper applied current based on the determined final damping force required for each corner.

The damper current applying device 390 may apply an actual driving current to the variable damper 200 based on the damper applied current determined by the damping force control device 380. The damping force of the variable damper 200 may be changed corresponding to the driving current applied by the damper current applying device 390. The damper current applying device 390 may control the operation of the solenoid valve by adjusting the amount of current applied to the solenoid valve of the variable damper 200. As the solenoid valve of the variable damper 200 operates, the actual damping force of each corner of the vehicle body may be changed. The damper current applying device 390 may prevent the variable damper 200 from being damaged by limiting the maximum current applied to the solenoid valve of the variable damper 200.

Figure 4:
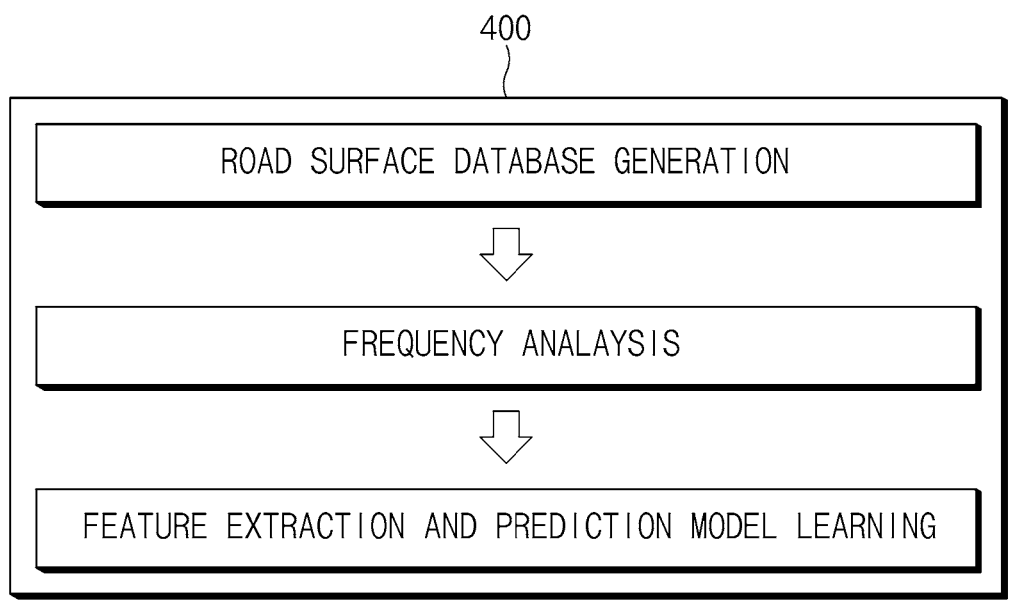
FIG. 4 is a flowchart illustrating a process of generating a prediction model according to exemplary embodiments of the present invention.
Figure 5:
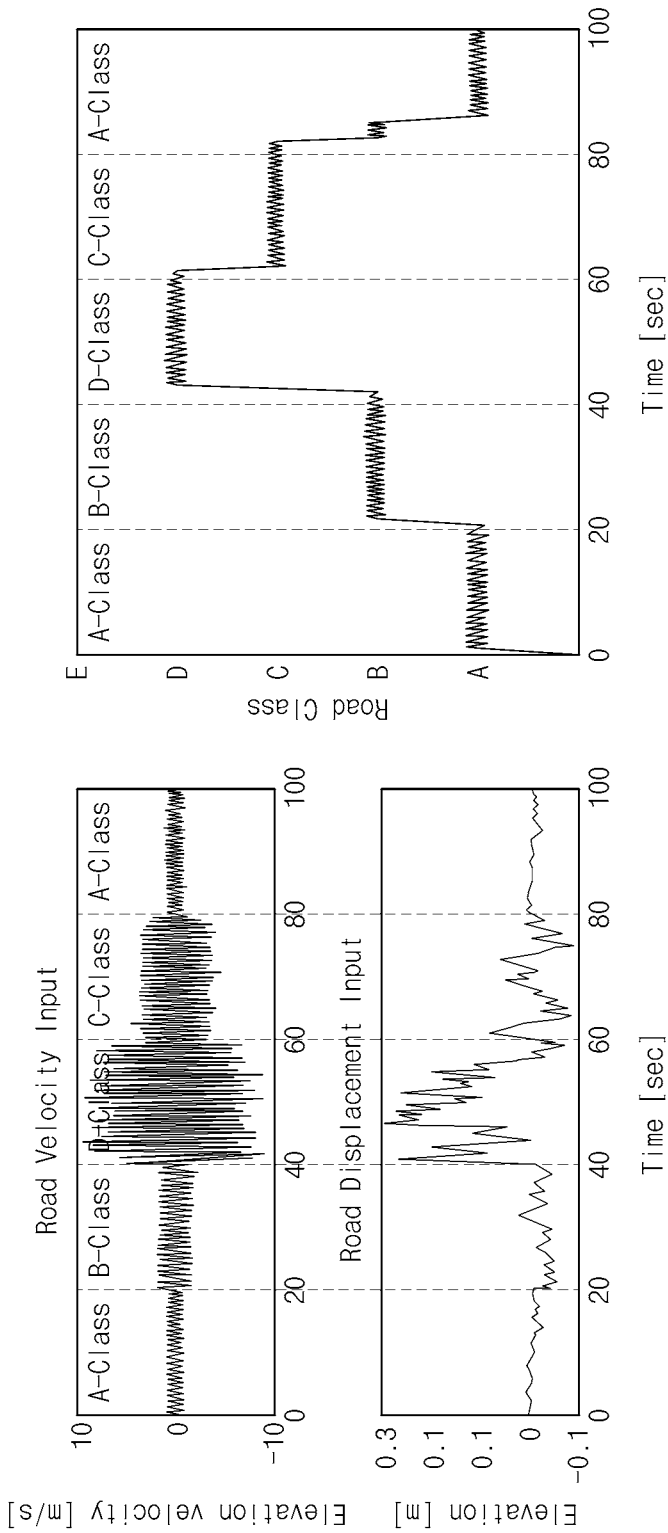
FIG. 5 is a graph illustrating a result of verifying prediction model matching according to exemplary embodiments of the present invention.

FIG. 4 is a flowchart illustrating a process of generating a prediction model according to exemplary embodiments of the present invention. FIG. 5 is a graph illustrating a result of verifying prediction model matching according to exemplary embodiments of the present invention. Prediction model generation may be performed in an external device (e.g., a computer, a server, and the like) in advance. An external device 400 may include a memory and a processor.

The external device 400 may generate a road surface database as a preliminary task for generating a road surface grade prediction model. The external device 400 may randomly generate road surface data (road profile) of various grades based on a rule (ISO 8606) and a specific rule for road surface roughness. In the instant case, the road surface data are road surface roughness data in the time domain.

The external device 400 may perform frequency analysis (e.g., spatial frequency analysis) based on the generated road surface data to convert it to frequency domain data. In other words, the external device 400 may convert time domain road surface roughness data into frequency domain road surface roughness data through the spatial frequency analysis.

The external device 400 may extract feature information from the time domain road surface roughness data and the frequency domain road surface roughness data. For example, the external device 400 may extract a root mean square (RMS) derived from time domain data and a slope and intercept of a linear feedback equation derived from frequency domain data as feature information. The external device 400 may generate a road surface grade classification model (i.e., a road surface grade prediction model) by performing supervised learning using the extracted features and the road surface roughness grade.

The external device 400 may upload the generated prediction model to the memory 302 of the controller 300. In other words, the external device 400 may upload the machine-learned prediction model to the memory 302 of the controller 300 by use of wired and/or wireless communication. Thereafter, the road surface grade classification device 360 of the controller 300 may classify the road surface grade in real time by use of the prediction model uploaded to the memory 302. Referring to FIG. 5, the road surface grade, which is classified in real time by use of a predictive model, has been verified for matching with the road surface grade classified in real time corresponding to the road speed and the road displacement.

Figure 6:
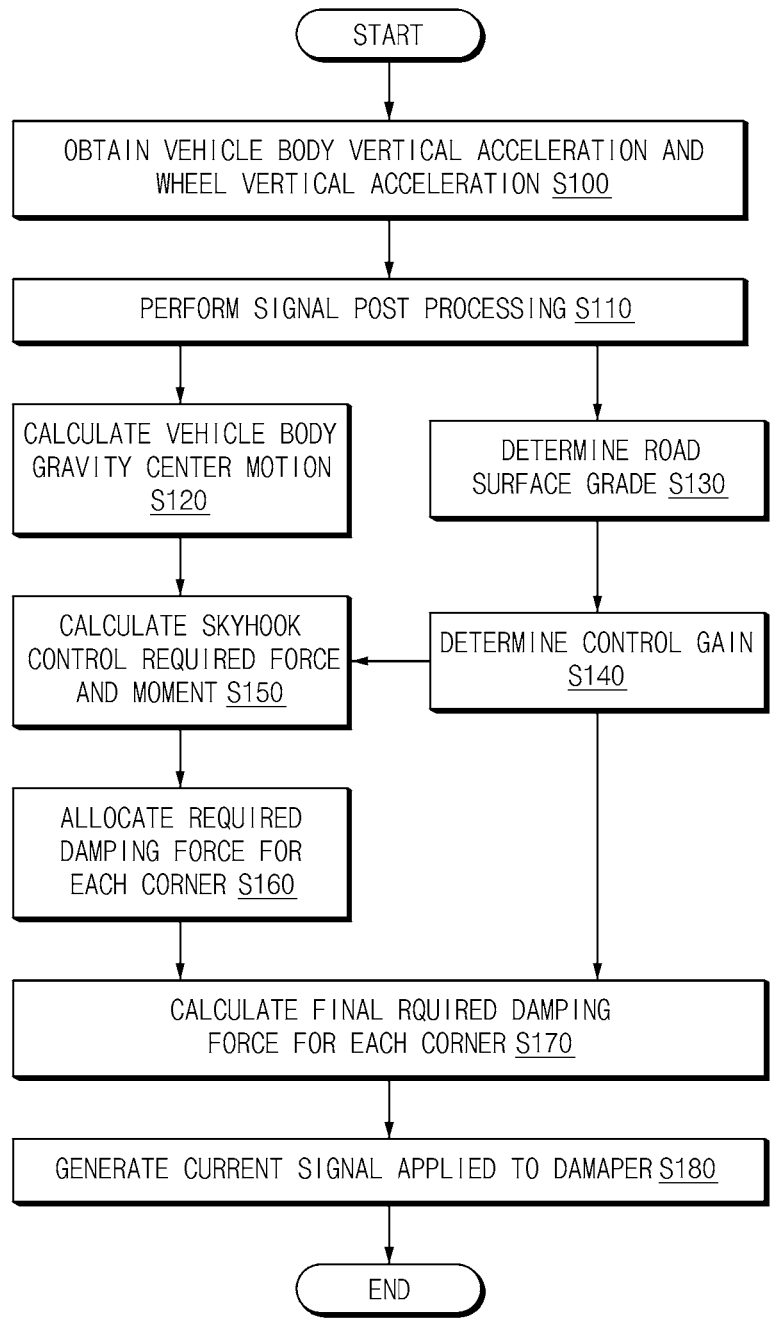
FIG. 6 is a flowchart illustrating a method of controlling a vehicle suspension according to exemplary embodiments of the present invention.
Figure 7:
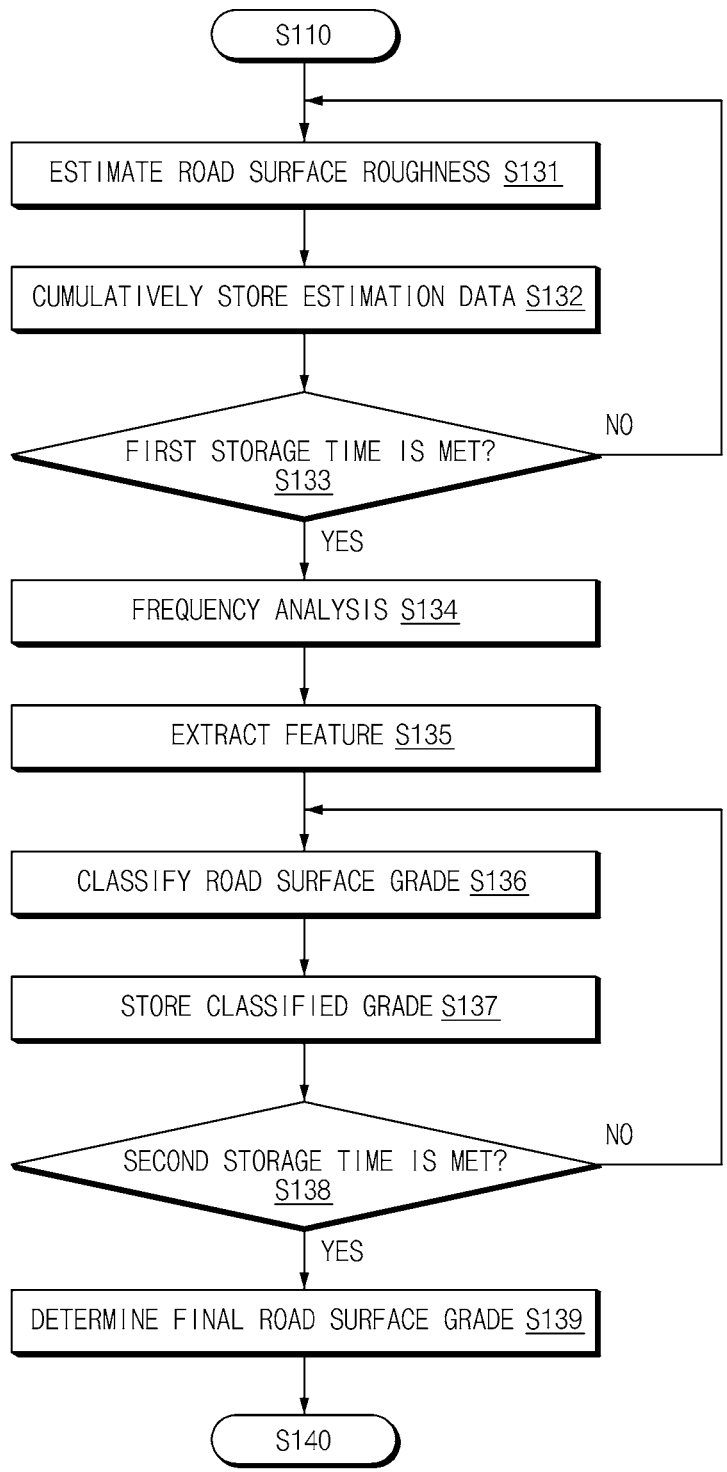
FIG. 7 is a flowchart illustrating a method of determining a road surface grade according to exemplary embodiments of the present invention.

FIG. 6 is a flowchart illustrating a method of controlling a vehicle suspension according to exemplary embodiments of the present invention. FIG. 7 is a flowchart illustrating a method of determining a road surface grade according to exemplary embodiments of the present invention.

In S100, the controller 300 may obtain the vehicle body vertical acceleration and the wheel vertical acceleration. The controller 300 may obtain the vehicle body vertical acceleration of each corner through the first acceleration sensor 110 and obtain the wheel vertical acceleration for each wheel through the second acceleration sensor 120. The vehicle body vertical acceleration of each corner (the vertical acceleration of the vehicle body) and the wheel vertical acceleration of each wheel (the vertical acceleration of the wheel) may be directly used for damping force control and road roughness estimation.

In S110, the controller 300 may perform post-processing for the vehicle body vertical acceleration and the wheel vertical acceleration. The controller 300 may perform filtering to remove noise included in signals received from the first acceleration sensor 110 and the second acceleration sensor 120. The controller 300 may determine the vehicle body vertical speed of each corner, the wheel vertical speed of each wheel, the vehicle body displacement information related to each corner, and the wheel displacement information related to each wheel through integration.

In S120, the controller 300 may determine the vehicle body gravity center motion (three-direction speed of the vehicle body gravity center point) by use of the vehicle body vertical speed (vehicle body vertical speed of each corner) and the vehicle specification information. The vehicle specification information may include the wheel base, the wheel tread, the distance between the front wheel and the vehicle body gravity center (vehicle gravity center), the distance between the rear wheel and the vehicle body gravity center, and the like. The controller 300 may determine the vertical speed, the pitch angular speed, and the roll angular speed of the vehicle gravity center based on the vehicle body vertical speed of each corner and the vehicle specification information. The controller 300 may use the vehicle kinematic relation formula when determining the vehicle body gravity center motion, and the vehicle kinematic relation formula may vary corresponding to the number of acceleration sensors mounted on the vehicle body and the wheels.

In S130, the controller 300 may determine the road surface grade based on the vehicle body vertical acceleration and the wheel vertical acceleration. The controller 300 may determine the roughness grade of a road surface by use of the machine learning-based road surface grade prediction model.

With reference to FIG. 7, a road surface grade prediction (classification) procedure will be described in more detail.

In S131, the controller 300 may estimate the road surface roughness in real time by use of the vehicle body vertical acceleration of each corner, the vertical acceleration of each wheel, and the vehicle body vertical speed of each corner and the wheel vertical speed of each wheel which are post-processed. The controller 300 may estimate the road surface roughness by use of a Kalman filter. The Kalman filter may estimate the road surface roughness that cannot be measured compared to a general estimator that estimates a state quantity.

The controller 300 may cumulatively store the estimated road surface roughness in the memory 302 in S132. The estimated road surface roughness is time domain data. Because data cannot be continuously accumulated and stored due to the storage space limit of the memory 302, the controller 300 may transmit the accumulated data for a specified time to a next process and then delete the corresponding accumulated data from the memory 302 to initialize and store new data.

In S133, the controller 300 may determine whether the data storage time period satisfies the first storage time period (e.g., 1 second or 2 seconds). The controller 300 may cumulatively store the estimated road surface roughness in a specified area in the memory 302 during the first storage time period t1.

When the data storage time period satisfies the first storage time period, in S134, the controller 300 may perform the frequency analysis (e.g., spatial frequency analysis) based on the cumulative road surface roughness. When the data storage time period satisfies the first storage time period, the controller 300 may activate the logic of the next operation and transfer the cumulatively stored road roughness data to the activated logic. The controller 300 may convert the time domain road surface roughness data into frequency domain data in real time through frequency analysis.

In S135, the controller 300 may extract the feature information from the road surface roughness in the time domain and the road surface roughness in the frequency domain. The controller 300 may extract the road roughness RMS in the time domain and/or the slope and intercept of the frequency domain linear feedback function as features.

In S136, the controller 300 may classify (predict) the roughness grade (i.e., the road surface grade) of a road surface by use of the extracted feature information and the machine learning-based road surface grade prediction model.

In S137, the controller 300 may cumulatively store the classified road surface grades. The controller 300 may store road surface grades classified in real time during the second storage time.

In S138, the controller 300 may check whether the road surface grade storage time period satisfies the second storage time. In the instant case, the second storage time period may be set to be greater than the first storage time.

In S139, the controller 300 may determine the final road surface grade when the road surface grade storage time period satisfies the second storage time. The controller 300 may maintain the road surface roughness grades predicted for the second storage time period in the memory 302 and may utilize a predetermined algorithm to determine the final road surface grade (e.g., class A, B, C, D, or E). For example, the controller 300 may determine the average of the road roughness grades stored in the memory 302 as the final road surface grade. Referring to following Table 1, when the road surface grade is classified into A, B, and C, and the road surface grade index matching each road surface grade is 1, 2 and 3, the controller 300 may determine the average of the cumulative grades which is determined as the final road surface grade.

TABLE 1

| Example | t1 | t2 | Cumulative grade | Cumulative grade index | Final road surface grade |
|---|---|---|---|---|---|
| 1 | 1 s | 5 s | A, A, A, B, A | 1, 1, 1, 2, 1 | 1.2 |
| 2 | 1 s | 7 s | A, A, B, A, B, A, A | 1, 1, 2, 1, 2, 1, 1 | 1.29 |

The final road surface grade determination method described above may prevent an impact feeling such as chattering, which occurs when the control gain is changed at short time intervals due to the repetition of sudden change and return of the road surface grade. In S140, the controller 300 may determine the control gain of the variable damper 200 based on the predicted road surface grade and the vehicle status information. The controller 300 may determine a driving situation such as turning, acceleration, and/or deceleration based on vehicle driving information to determine appropriate skyhook control gain and passive damping control gain.

In S150, the controller 300 may determine the skyhook control required force and moment based on the three-direction speed of the vehicle gravity center determined in S120 and the skyhook control gain determined in S140. The controller 300 may determine the skyhook required damping force proportional to the vertical speed, the pitch angular speed, and the roll angular speed of the vehicle gravity center determined in S120 and the skyhook control gain determined in S140.

In S160, the controller 300 may allocate the required damping force for each corner that can satisfy the force and moment required to attenuate the three-direction speed of the vehicle gravity center by use of the conversion formula used in S120. The controller 300 may allocate the damping force required for each corner of the vehicle body based on the determined skyhook control required force and moment.

In S170, the controller 300 may determine the final required damping force for each corner by integrating the skyhook required damping force for each corner of the vehicle body and the passive damping force for each wheel. The controller 300 may determine the passive damping force for each wheel based on the passive damping control gain determined in S140, the vehicle body vertical speed of each corner, and the wheel vertical speed.

In S180, the controller 300 may generate the current signal which is actually applied to the variable damper 200 based on the final required damping force for each corner and the damper feature. The controller 300 may determine the amount of current to be applied to the solenoid valve of the variable damper 200 in consideration of the final required damping force for each corner and the feature of the variable damper 200. The controller 300 may generate a current signal based on the determined amount of current and apply the current signal to the solenoid valve. Furthermore, the controller 300 may limit the upper and lower limits of the current signal in consideration of an actuator (e.g., a solenoid valve) load and the minimum driving current.

Figure 8:
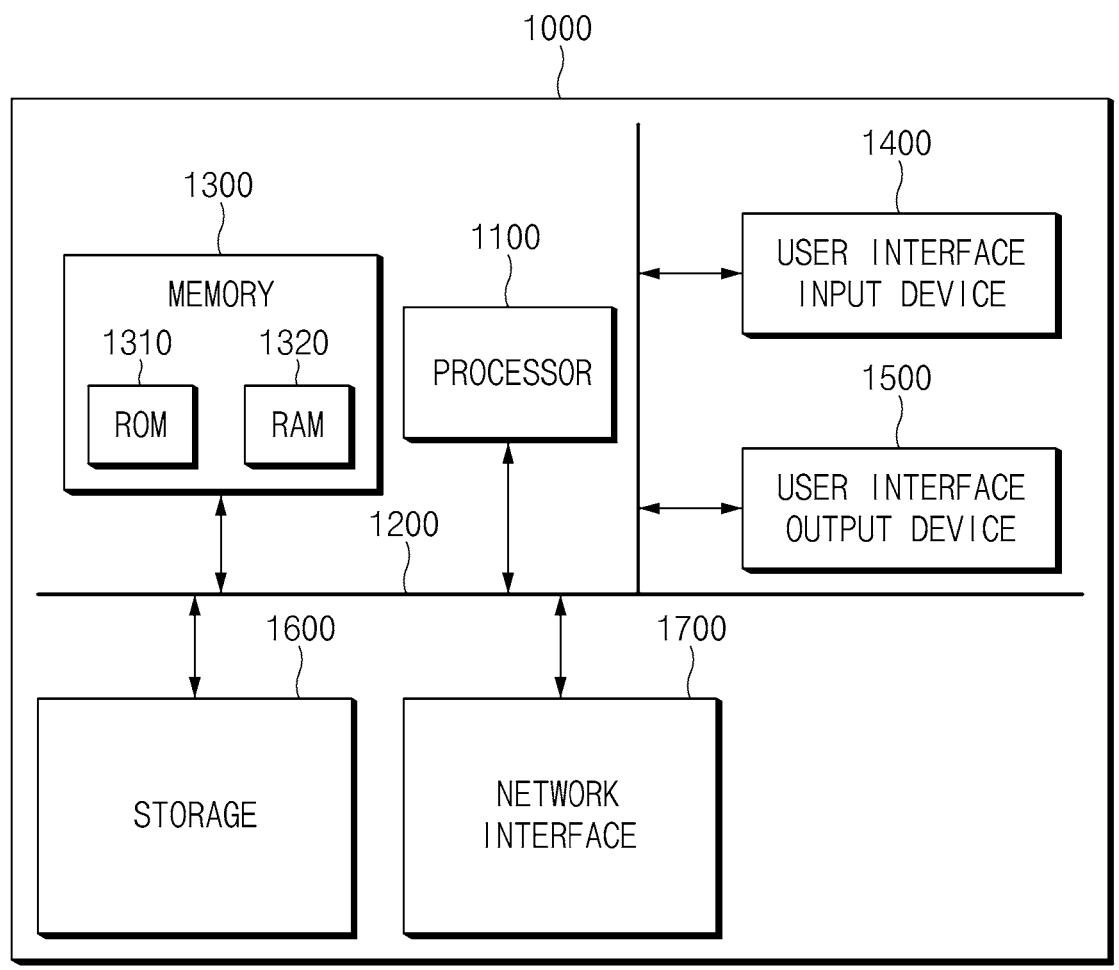
FIG. 8 is a block diagram illustrating a determining system for executing a method of controlling a vehicle suspension according to various exemplary embodiments of the present invention.

FIG. 8 is a block diagram illustrating a computing system for executing a method of controlling a vehicle suspension according to various exemplary embodiments of the present invention.

Referring to FIG. 8, a computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the exemplary embodiments of the present invention may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor 1100 and the storage medium may reside in the user terminal as an individual component.

According to various exemplary embodiments of the present invention, by use of a road surface roughness estimated in real time through measurement values of vertical acceleration sensors attached to a vehicle body and a wheel and a prediction model learned in advance based on machine learning, it is possible to classify the roughness grade of a road surface, and control the damping force of a variable damper based on the classified roughness grade of the road surface, so that a differentiated ride comfort may be provided.

According to various exemplary embodiments of the present invention, because the road surface roughness grade is determined in real time, the features of the variable damper may be changed in real time by adapting to the external environment of the vehicle such as a road surface. For example, it is possible to additionally secure tire grip force by increasing the ride comfort gain on a soft road surface and increasing passive damping on a rough road surface.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling a vehicle suspension, the apparatus comprising:
   a variable damper mounted between a vehicle body and a wheel of a vehicle;
   a sensor configured to measure a vehicle body vertical acceleration and a wheel vertical acceleration; and
   a controller including a processor configured to estimate a road surface roughness according to the vehicle body vertical acceleration and the wheel vertical acceleration, predict a road surface grade according to the estimated road surface roughness, and adjust a damping force of the variable damper according to the predicted road surface grade.

2. The apparatus of claim 1, wherein the sensor includes:
   a first acceleration sensor mounted on each corner of the vehicle body to measure a vertical acceleration of each corner of the vehicle body; and
   a second acceleration sensor mounted on each wheel of the vehicle to measure a vertical acceleration of each wheel.

3. The apparatus of claim 1, wherein the controller is configured to obtain vertical speeds and displacement information related to the vehicle body and the wheel through integration after filtering noise from the vehicle body vertical acceleration and the wheel vertical acceleration measured by the sensors.

4. The apparatus of claim 1, wherein the controller is configured to estimate and cumulatively store the road surface roughness by use of a Kalman filter for a first storage time period.

5. The apparatus of claim 1, wherein the controller is configured to convert the estimated road surface roughness into frequency domain data through frequency analysis, extract feature information from the estimated road surface roughness and the frequency domain data, classify the road surface grade by use of the feature information and a machine learning-based prediction model, cumulatively store road surface grades classified for a second storage time period, and determine a final road surface grade according to the cumulative road surface grades.

6. The apparatus of claim 1, wherein the controller is configured to determine a skyhook control gain and a passive damping control gain according to the road surface grade, determine skyhook required damping force according to gravity center motion information related to the vehicle body and the skyhook control gain, determine passive damping force by use of a vehicle body vertical speed, a wheel vertical speed and the passive damping control gain, and determine final damping force required for each corner according to the skyhook required damping force and the passive damping force.

7. The apparatus of claim 6, wherein the controller is configured to determine a vertical speed, a pitch angular speed, and a roll angular speed of a vehicle gravity center by use of the vehicle body vertical speed and vehicle specification information, determine the skyhook required damping force proportional to the vertical speed, the pitch angular speed, and the roll angular speed of the vehicle gravity center and the skyhook control gain, and allocate damping force required for each corner to attenuate the vertical speed, the pitch angular speed, and the roll angular speed of the vehicle gravity center according to the skyhook required damping force.

8. The apparatus of claim 6, wherein the controller is configured to generate a current signal according to the final damping force required for each corner and apply the current signal to the variable damper.

9. The apparatus of claim 8, wherein the controller is configured to determine an amount of current applied to the variable damper according to the final damping force required for each corner and characteristics of the variable damper.

10. The apparatus of claim 8, wherein the controller is configured to limit maximum and minimum currents applied to the variable damper in consideration of an actuator load and the minimum current of the variable damper.

11. A method of controlling a vehicle suspension, the method comprising:
    measuring a vehicle body vertical acceleration and a wheel vertical acceleration;
    estimating, by a controller, a road surface roughness according to the vehicle body vertical acceleration and the wheel vertical acceleration;
    predicting, by the controller, a road surface grade according to the road surface roughness; and
    adjusting, by the controller, a damping force of a variable damper according to the road surface grade.

12. The method of claim 11, further including:
    filtering, by the controller, noise from the vehicle body vertical acceleration and the wheel vertical acceleration; and obtaining, by the controller, a vehicle body vertical speed and a wheel vertical speed by integrating the vehicle body vertical acceleration and the wheel vertical acceleration filtered.

13. The method of claim 11, wherein the estimating of the road surface roughness includes:
    estimating the road surface roughness by use of a Kalman filter.

14. The method of claim 13, wherein the estimating of the road surface roughness further includes:
    cumulatively storing the road surface roughness for a first storage time period.

15. The method of claim 11, wherein the predicting of the road surface grade includes:
    converting the estimated road surface roughness into frequency domain data through frequency analysis;
    extracting feature information from the estimated road surface roughness and the frequency domain data;
    classifying the road surface grade by use of the feature information and a machine learning-based prediction model,
    cumulatively storing road surface grades classified for a second storage time period, and
    determining a final road surface grade according to the cumulative road surface grades.

16. The method of claim 11, wherein the adjusting of the damping force of the variable damper includes:
    determining a skyhook control gain and a passive damping control gain according to the road surface grade;
    determining skyhook required damping force according to gravity center motion information related to the vehicle body and the skyhook control gain;
    determining passive damping force by use of a vehicle body vertical speed, a wheel vertical speed and the passive damping control gain; and
    determining final damping force required for each corner according to the skyhook required damping force and the passive damping force.

17. The method of claim 16, wherein the determining of the skyhook required damping force includes:
    determining a vertical speed, a pitch angular speed and a roll angular speed of a vehicle gravity center by use of the vehicle body vertical speed and vehicle specification information;
    determining the skyhook required damping force proportional to the vertical speed, the pitch angular speed and the roll angular speed of the vehicle gravity center and the skyhook control gain; and
    allocating damping force required for each corner to attenuate the vertical speed, the pitch angular speed and the roll angular speed of the vehicle gravity center according to the skyhook required damping force.

18. The method of claim 16, further including:
    generating a current signal according to the final damping force required for each corner and applying the current signal to the variable damper.

19. The method of claim 18, wherein the generating and applying of the current signal to the variable damper includes:
    determining an amount of current applied to the variable damper according to the final damping force required for each corner and characteristics of the variable damper.

20. The method of claim 18, wherein the generating and applying of the current signal to the variable damper includes:
    limiting maximum and minimum currents applied to the variable damper in consideration of an actuator load and the minimum current of the variable damper.

* * * * *